(12) United States Patent
Wolter et al.

(10) Patent No.: US 9,214,985 B2
(45) Date of Patent: *Dec. 15, 2015

(54) COORDINATING POWER DISTRIBUTION LINE COMMUNICATIONS

(71) Applicant: Landis+Gyr Technologies, LLC, Pequot Lakes, MN (US)

(72) Inventors: Chad Wolter, Breezy Point, MN (US); Rolf Flen, Pequot Lakes, MN (US); Damian Bonicatto, Pequot Lakes, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,299

(22) Filed: Apr. 2, 2014

(65) Prior Publication Data

US 2014/0211867 A1 Jul. 31, 2014

Related U.S. Application Data

(63) Continuation of application No. 13/334,502, filed on Dec. 22, 2011, now Pat. No. 8,693,605.

(51) Int. Cl.
*H04L 7/00* (2006.01)
*H04B 3/54* (2006.01)

(52) U.S. Cl.
CPC .............. *H04B 3/542* (2013.01); *H04L 7/0091* (2013.01); *H04B 2203/5408* (2013.01); *H04B 2203/5441* (2013.01)

(58) Field of Classification Search
CPC .................................. H04B 4/54; H04B 3/542

USPC .......................... 375/356, 369, 354, 257, 259
See application file for complete search history.

(56) References Cited

U.S. PATENT DOCUMENTS

| | | | |
|---|---|---|---|
| 5,581,229 A | 12/1996 | Hunt | |
| 6,154,488 A | 11/2000 | Hunt | |
| 6,177,884 B1 | 1/2001 | Hunt et al. | |
| 6,859,742 B2 | 2/2005 | Randall et al. | |
| 6,975,655 B2 | 12/2005 | Fischer et al. | |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |

(Continued)

*Primary Examiner* — Kevin Kim
(74) *Attorney, Agent, or Firm* — Crawford Maunu PLLC

(57) ABSTRACT

Aspects of the present disclosure are also directed towards a method that includes maintaining a transmission period which has a start time and an end time synchronized to metrological time. Further, this method, in response to the start time, begins transmission of a frame, which includes a plurality of symbols. This transmission occurs over power distribution lines that carry power using alternating current (AC). This method also includes synchronizing a transmission time for each symbol of the plurality of symbols according to a time-based parameter of the AC. In response to reaching an end of the frame, a synchronization symbol period is determined for a synchronization symbol, as a function of the transmission times, for the plurality of symbols and time from the end of the frame to the end time. The synchronization symbol is then transmitted on the power distribution lines.

20 Claims, 6 Drawing Sheets

(56) References Cited

U.S. PATENT DOCUMENTS

| | | |
|---|---|---|
| 7,346,463 B2 | 3/2008 | Petite et al. |
| 7,369,579 B2 | 5/2008 | Logvinov et al. |
| 7,432,824 B2 | 10/2008 | Flen et al. |
| 7,443,313 B2 | 10/2008 | Davis et al. |
| 7,468,661 B2 | 12/2008 | Petite et al. |
| 7,706,320 B2 | 4/2010 | Davis et al. |
| 7,738,999 B2 | 6/2010 | Petite |
| 7,742,393 B2 | 6/2010 | Bonicatto et al. |
| 7,774,530 B2 | 8/2010 | Haug et al. |
| 7,791,468 B2 | 9/2010 | Bonicatto et al. |
| 7,877,218 B2 | 1/2011 | Bonicatto et al. |
| 7,978,059 B2 | 7/2011 | Petite et al. |
| 8,144,816 B2 | 3/2012 | Bonicatto et al. |
| 8,144,820 B2 | 3/2012 | Bonicatto |
| 8,194,789 B2 | 6/2012 | Wolter et al. |
| 8,238,263 B2 | 8/2012 | Kohout et al. |
| 2005/0169363 A1 | 8/2005 | Logvinov et al. |
| 2007/0025391 A1 | 2/2007 | Yonge, III et al. |
| 2007/0025398 A1 | 2/2007 | Yonge, III et al. |
| 2008/0258882 A1 | 10/2008 | Lester et al. |
| 2008/0304595 A1 | 12/2008 | Haug et al. |
| 2010/0183029 A1 | 7/2010 | Yoshizawa et al. |
| 2011/0121952 A1 | 5/2011 | Bonicatto et al. |
| 2011/0176598 A1 | 7/2011 | Kohout et al. |
| 2011/0196631 A1 | 8/2011 | Martin |
| 2011/0218686 A1 | 9/2011 | McHann, Jr. et al. |
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0106664 A1 | 5/2012 | Bonicatto et al. |

COORDINATING POWER DISTRIBUTION LINE COMMUNICATIONS

BACKGROUND

Service providers utilize distributed networks to provide services to customers over large geographic areas. For example, power companies use power distribution lines to carry power from one or more generating stations (power plants) to residential and commercial customer sites alike. The generating stations use alternating current (AC) to transmit power over long distances via the power distribution lines. Long-distance transmission can be accomplished using a relatively high voltage. Substations located near the customer sites provide a step-down from the high voltage to a lower voltage (e.g., using transformers). Power distribution lines carry this lower-voltage AC from the substations to the endpoint devices customer sites.

Communications providers may utilize a distributed communications network to provide communications services to customers. Similarly, power companies utilize a network of power lines, meters, and other network elements to provide power to customers throughout a geographic region and to receive data from the customer locations (e.g., including but not limited to data representing metered utility usage). A system can provide these reporting functions using a set of data-collecting devices (collectors) that are designed to communicate with nearby endpoint devices. However, data communication between a command center, collectors and many thousands of endpoint devices over power distribution lines can be a particularly challenging issue. The sheer number of endpoint devices contributes to a host of issues including synchronization, communication bandwidth and cost concerns. Other problems relate to signal interference and coordination between communicating devices.

SUMMARY

The present disclosure is directed to systems and methods for use with coordinated communications between devices and over power distribution lines. These and other aspects of the present disclosure are exemplified in a number of illustrated implementations and applications, some of which are shown in the figures and characterized in the claims section that follows.

Coordinating data communications between a data-distributing device, such as a collector, and many endpoint devices over power distribution lines can be a particularly challenging issue. For certain applications, the sheer number of endpoint devices can contribute to a host of issues including synchronization, communication bandwidth and cost concerns. These and other issues can be appreciated in connection with one or more of the embodiments discussed herein.

Example embodiments of the instant disclosure include various methods and apparatuses. Consistent with the instant disclosure, certain embodiments are directed towards a method useful for coordinating communications between multiple endpoint devices and multiple collector devices. The communications between these endpoint devices and collector devices occurs over power distribution lines (carrying power using alternating current (AC)). In this method for coordinating communications, data is communicated over the power distribution lines, from the data-collecting (or collector) devices to the endpoint devices, utilizing a protocol that is defined by a first timing and a second timing. The first and second timing can be used to indicate when data frames are to be transmitted and when the symbols within the data frames are to be transmitted. Further, the method includes generating a collector clock at the collector (e.g., using a local oscillator circuit), and, using the collector clock as a time base, maintaining a collector network time. In certain embodiments, the first timing is determined from the collector network time (at each collector device). Additionally, at each collector device, the frequency for the AC carried on the power distribution lines can be tracked. The second timing is determined from the tracked frequency. Moreover, the method, of the instant embodiment, includes adjusting an endpoint network time, at each endpoint device, in response to time-indicating packets/data received from a collector device.

In certain embodiments, this method can be useful for coordinating communications that can include additional steps. For example, the method can further include calculating the time from the end of a first frame (as determined by the second timing) to the start of a second frame (as determined by the first timing). An additional step of determining how many synchronization symbols can be transmitted before the start of the second frame is also included with the step of calculating the time from the end of the first frame to the start of the second frame. The number of synchronization symbols is determined based upon the rate of symbol transmission for the first frame and the calculated time. The network times, utilized in this method, can be periodically adjusted in response to an externally-maintained standardized time.

In other example embodiments, the first timing defines when data frames are transmitted, and thereafter, data symbols are transmitted in response to the AC (e.g., a symbol periodicity is adjusted based upon a frequency of the AC). The data symbols used in this method can be encoded using, as a non-limiting example, quadrature phase shift keying (QPSK). For embodiments using QPSK or other encoding protocols, the AC can be used as a time base by periodically/repeatedly executing a software code module, such as an interrupt service routine (ISR), that monitors a signal value of the AC. This code/ISR can be repeatedly called at a rate that is sufficiently fast to provide synchronicity for the encoded QPSK symbols, the synchronicity being relative an endpoint device that uses another interrupt routine to generate a AC-frequency time base that is used to decode the symbols.

Embodiments of the present disclosure are also directed towards a method that includes maintaining a transmission period which has a start time and an end time synchronized to network time. Further, this method, in response to the start time, begins transmission of a frame, which includes a plurality of symbols. This transmission occurs over power distribution lines that carry power using alternating current (AC). This method also includes synchronizing a transmission time for each symbol of the plurality of symbols with a corresponding signal transition of the AC. In response to reaching an end of the frame, a synchronization symbol period is determined for an adjusted synchronization symbol, as a function of the transmission times, for the plurality of symbols and time from the end of the frame to the end time. The adjusted synchronization symbol is then transmitted on the power distribution lines.

In certain specific embodiments of this method, each symbol of the plurality of symbols has a common symbol period. Further, the symbol period of the synchronization symbol is less than the common symbol period. The symbol, of the plurality of symbols, in certain example embodiments of this method are further defined as having a common symbol period. In those instances, a synchronization symbol period is determined based upon a number of symbols of the common symbol period that can be transmitted in the time from the end of the frame to the end time.

Embodiments of the instant disclosure are also directed towards a device that includes a network time clock circuit, a system time clock circuit, and a processing circuit. The network clock circuit, of this device, is responsive to a network time-of-day, and the system time clock circuit is responsive to a frequency of an alternating current that is carried on power distribution lines. The processing circuit is designed to determine a transmission period having start and end times determined by using the network time clock. Further, the processing circuit is configured to begin transmission of a frame including a plurality of symbols, in response to the start time and over power distribution lines that carry power using alternating current (AC). The processing circuit is designed to synchronize a transmission time for each symbol of the plurality of symbols to the system time clock. In response to reaching an end of the frame, the processing circuit is designed to determine a symbol length for a synchronization symbol as a function of time from the end of the frame to the end time and transmission times for the plurality of symbols. The processing circuit is configured to then transmit the synchronization symbol over the power distribution lines.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

Figure 1:
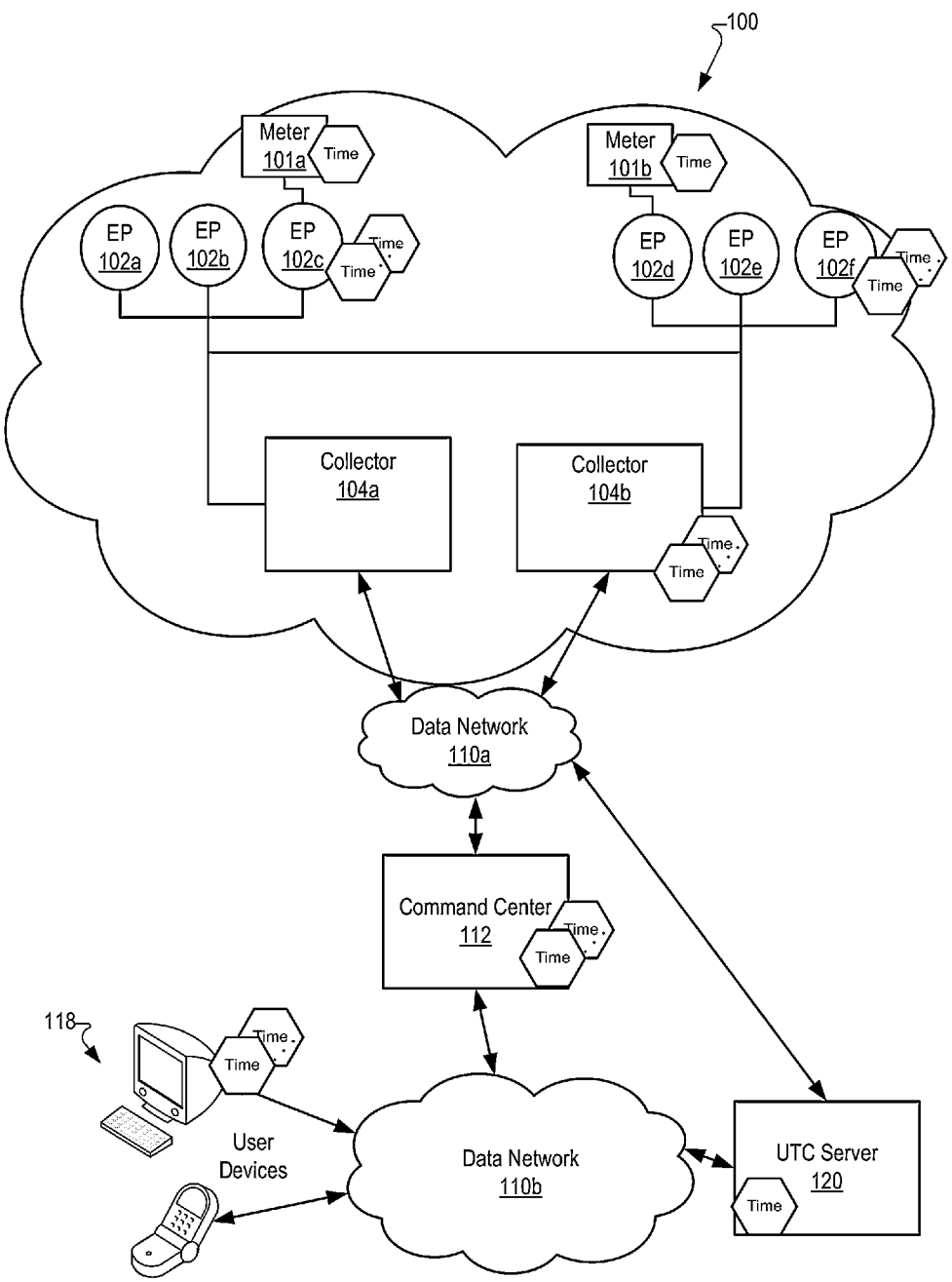
FIG. 1 is a block diagram of an example network environment in which endpoints communicate data with collector units, consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements for coordinating communications between multiple levels of devices using power distribution lines as communication carriers. While the present disclosure is not necessarily limited to such applications, various aspects of the disclosure may be appreciated through a discussion of various examples using this context.

A particular use of power line communications relates to utility meter reading applications. In utility meter reading applications (as well as other applications), there can be millions of endpoint devices providing coordinated readings. Communicating downstream to so many endpoints represents a daunting task, which is worsened by the communication constraints caused by the use of power distribution lines. For instance, there can be constraints relating to interference harmonics caused by alternating current (AC) on the power distribution lines. For utility usage reporting and associated billing functions, the time-of-day can be an important consideration. Moreover, the communications protocols between the different layers of communications devices may require time-based coordination between devices. The timing coordination demands on the system can be significant as the data bandwidth of the system increases (e.g., due, at least in part, to the constraints caused by the use of power distribution lines). Aspects of the present disclosure, although not necessarily limited to the above characterizations and problems, are directed toward the coordination of communications to endpoints. These communications can use different timebases and provide adjustments to the communication protocol in order to account for such differences.

Aspects of the present disclosure recognize that transmitting symbols based upon a local oscillator can frustrate reception of a downstream signal by an endpoint. This can also cause inter-modulation harmonics relative to the transmit carrier frequency. Other aspects of the present disclosure recognize that using a symbol clock based solely upon the AC frequency can create a host of time-based communication problems when coordinating communications between pluralities of endpoint devices.

Example embodiments of the instant disclosure include various methods, devices and systems. Consistent with the instant disclosure, certain embodiments are directed towards a method useful for coordinating communications between multiple endpoint devices and multiple collector devices. The communications between these endpoint devices and collector devices occurs over power distribution lines (carrying power using alternating current (AC)). In this method for coordinating communications, data is communicated over the power distribution lines, from the collector devices to the endpoint devices, utilizing a protocol that is defined by a first timing and a second timing. The first timing defines when data frames are transmitted, and the second timing defines when the symbols within the data frames are transmitted. Further, at each collector device, the method includes generating a clock (e.g., from a local oscillator circuit), and, using the clock as a time base, maintaining a collector network time. The first timing is determined from the collector network time (at each collector device). Additionally, at each collector device, the frequency of AC carried on the power distribution lines is tracked. The second timing is determined from tracked frequency. Moreover, the method, of the instant embodiment, includes adjusting the endpoint network time, at each endpoint device, in response to time-indicating packet/data received from a collector device.

In certain embodiments, the method can further include calculating the time from the end of a first frame (as determined by the second timing) to the start of a second frame (as determined by the first timing). An additional step of determining how many synchronization symbols can be transmitted before the start of the second frame is also included with the step of calculating the time from the end of the first frame to the start of the second frame. The number of synchronization symbols is determined based upon the rate of symbol transmission for the first frame and the calculated time. The network time can be adjusted in response to an externally maintained standardized time, in certain embodiments.

In other example embodiments, the first timing defines when data frames are transmitted, and thereafter, data symbols are transmitted in response to a time-based parameter of the AC (e.g., a sensed frequency of the AC). The data symbols used in this method useful for coordinating communications, in other example embodiments, are encoded using quadrature phase shift keying (QPSK). For embodiments using QPSK, the frequency of the AC can be tracked by repeatedly (or periodically) executing code (e.g., operating an interrupt routine or polling routine) to sense a signal value of the AC. The signal value can include, but is not limited to, a (zero/nonzero) voltage crossing event, a rising/falling edge, or (min/max) peak detection. For simplicity, the repeated code is referred to hereafter as an interrupt routine. This interrupt routine is operated at a rate that is sufficiently fast to provide synchronicity for the encoded QPSK symbols to be decoded at an endpoint that uses its own interrupt routine to sense a signal value of the AC. The endpoint can then use the sensed signal value for the purpose of determining the AC frequency.

Embodiments of the present disclosure are also directed towards a method that includes maintaining a transmission period, which has a start time and an end time synchronized to a network time. Further, this method, in response to the start time, begins transmission of a frame, which includes a plurality of symbols. This transmission occurs over power distribution lines that carry power using alternating current (AC). This method also includes synchronizing a transmission time for each symbol of the plurality of symbols with a corresponding signal transition of the AC. In response to reaching an end of the frame, a synchronization symbol period is determined for an adjusted synchronization symbol, as a function of the transmission times, for the plurality of symbols and time from the end of the frame to the end time. The adjusted synchronization symbol is then transmitted over the power distribution lines.

In certain specific embodiments of this method, each symbol of the plurality of symbols has a common symbol period. Further, the symbol period of the adjusted synchronization symbol is different (less or greater) than the common symbol period. In those instances, this method includes determining the synchronization symbol period by determining a number of symbols of the common symbol period that can be transmitted in the time from the end of the frame to the end time. Accordingly, the adjusted synchronization symbol can be used in combination with the determined number of symbols of the common symbol period.

Embodiments of the instant disclosure are also directed towards a device that includes a network time clock circuit, a system time clock circuit, and a processing circuit. The network clock circuit, of this device, is responsive to a network time-of-day, and the system time clock circuit is responsive to a frequency of an alternating current that is carried on power distribution lines. The processing circuit is designed to determine a transmission period having start and end times determined by using the network time clock. Further, the processing circuit is configured to begin transmission of a frame including a plurality of symbols, in response to the start time and over power distribution lines that carry power using alternating current (AC). The processing circuit is designed to synchronize a transmission time for each symbol of the plurality of symbols to the system time clock. In response to reaching an end of the frame, the processing circuit is designed to determine a symbol length for a synchronization symbol as a function of time from the end of the frame to the end time and transmission times for the plurality of symbols. The processing circuit is configured to then transmit the synchronization symbol on the power distribution lines.

Consistent with various embodiments of the present disclosure, the power distribution lines can carry power that is provided from one or more generating stations (power plants) to residential and commercial customer sites alike. The generating station uses AC to transmit the power long distances over the power distribution lines. Long-distance transmission can be accomplished using a relatively high-voltage. Substations located near the customer sites provide a step-down from the high-voltage to a lower-voltage (e.g., using transformers). Power distribution lines carry this lower-voltage AC from the substations to the customer sites. Depending upon the distribution network, the exact voltages and AC frequencies can vary. For instance, voltages can generally be in the range 100-240 V (expressed as root-mean-square voltage) with two commonly used frequencies being 50 Hz and 60 Hz. In the United States, for example, a distribution network can provide customer sites with 120 V and/or 240 V, at 60 Hz.

FIG. 1 is a block diagram of an example network environment 100 in which endpoints 102 communicate data with collector units 104, consistent with embodiments of the present disclosure. The network environment 100 includes a service network in which a plurality of endpoints 102a-102f are coupled (e.g., communicatively coupled) to collector units 104a, 104b. Consistent with embodiments of the present disclosure, the endpoints 102 can provide data from utility meters (101a, 101b). For instance, data can be provided from power meters, gas meters and water meters, which are respectively installed in gas and water distribution networks. Moreover, while the present disclosure generally refers to the endpoints 102 as providing data utility (e.g., power) metering over a power distribution network, other data can also be communicated.

The endpoints 102 can be implemented to monitor and report various operating characteristics of the service network. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

The endpoints 102 report the operating characteristics of the network over communications channels. Communications channels are portions of spectrum over which data are transmitted. The center frequency and bandwidth of each communications channel can depend on the communications system in which they are implemented. In some implementations, the communications channels for utility meters (e.g., power, gas and/or water meters) can be transmitted using power line communication networks that allocate available bandwidth between endpoints according to an orthogonal frequency division multiple access (OFDMA) spectrum allocation technique or another channel allocation technique.

When the endpoints 102 are implemented in connection with power meters in a power distribution network, the endpoints transmit reporting data that specify updated meter information that can include measures of total power consumption, power consumption over a specified period of time, peak power consumption, instantaneous voltage, peak voltage, minimum voltage and other measures related to power consumption and power management (e.g., load information). Each of the endpoints can also transmit other data, such as status data (e.g., operating in a normal operating mode, emergency power mode, or another state such as a recovery state following a power outage).

In some implementations, symbols (representing one or more bits representing reporting and/or the status data) are transmitted on the power distribution lines over a specified symbol period. A symbol period is a period of time over which each symbol is communicated. A number of symbols are contained within a frame period, representing the time over which a complete frame is communicated, wherein each frame provides synchronization for symbols of the same frame.

In FIG. 1, endpoints 102*a*-102*c* and 102*d*-102*f* transmit symbols over communications channels to collector units 104*a*, 104*b*, respectively. The collector units 104 can include circuitry (e.g., including one or more data processors) that is configured and arranged to communicate with the endpoints over power distribution lines. The collector units 104 can also include circuitry for interfacing with a command center 112. The interface to the command center 112 can be implemented using a variety of different communication networks including, but not limited to, a wide-area network (WAN) using Ethernet.

According to certain embodiments of the present disclosure, the collectors are installed in substations and used to control bidirectional communication with both the command center 112 (e.g., located at a utility office) and endpoints (e.g., located at metering locations for customer sites). This messaging to the endpoints can be sent to an individual endpoint, or broadcast simultaneously to a group of endpoints connected to the collectors 104. Consistent with certain embodiments, the collectors 104 are built according to an industrial-grade computer specification in order to withstand the harsh environment of a substation.

In certain embodiments of the present disclosure, the collector(s) 104 can receive data from many different endpoints 102 while storing the data in a local database. A collector can also take action based on the data received from the endpoints and transmit data received from the endpoints to a command center 112. For example, in a PLC network, the command center 112 can receive data indicating that power usage is significantly higher in a particular portion of a power network than in other portions of the power network. Based on this data, the command center 112 can allocate additional resources to that particular portion of the network (i.e., load balance) or provide data specifying that there is increased power usage in the particular portion of the power network.

Consistent with certain embodiments, the command center 112 provides an interface that allows user devices 118 access to data received from endpoints 102. For example, the user devices might be owned by utility provider operator, maintenance personnel and/or customers of the utility provider. For example, data identifying the increased power usage described above can be provided to a user device 118 accessible by the network operator, who can, in turn, determine an appropriate action regarding the increased usage. Additionally, data identifying a time-of-use measure and/or a peak demand measure can also be provided to user devices 118. Similarly, if there has been a power outage, the command center 112 can provide data to user devices 118 that are accessible by customers to provide information regarding the existence of the outage and potentially provide information estimating the duration of the outage.

The data networks 110*a* and 110*b* can each be a wide area network (WAN), local area network (LAN), the Internet, or any other communications network. The data networks 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. In certain embodiments, the data networks 110 overlap with each other. In some embodiments, they can be the same data network. For instance, each network 110 could provide data, at least in part, over the Internet.

Symbols from a particular endpoint may be transmitted over anyone of thousands of communications channels in a PLC system. For example, each endpoint can be assigned a particular channel using OFDMA or another channel allocation technique. Channel assignments for the endpoints 102*a*-102*c*, 102*d*-102*f* that communicate with particular collectors 104*a*, 104*b* can be stored, for example, in an communications database that is accessible to the command center 112 and/or the collectors 104*a*, 104*b*.

Consistent with embodiments of the present disclosure, each collector 104 can be configured to be in communication with thousands of endpoints 102 and there can be thousands of collectors 104 in connection with the command center 112. For example, a single collector can be configured to communicate with over 100,000 endpoint devices and a command center can be configured to communicate with over 1,000 collectors. Thus, there can be millions of total endpoints and many thousands of these endpoints can communicate to a common collector over a shared power distribution line. Accordingly, embodiments of the present disclosure are directed toward coordinating communications using carefully designed time-based protocols and related considerations.

As a part of the instant disclosure, a method useful for coordinating communication between the endpoint devices 102*a*-102*f* and collector devices 104*a*-104*b* is discussed. The coordinated communications between the endpoint devices 102*a*-102*f* and collector devices 104*a*-104*b* occurs over power distribution lines that carry power using alternating current (AC). This method includes communicating data, over the power distribution lines, from the collector devices 104*a*-104*b* to the endpoint devices 102*a*-102*f* utilizing a protocol that is defined by a first timing and a second timing. The first timing defines when data frames are transmitted, and the second timing defines when the symbols within the data frames are transmitted. In certain embodiments, the first timing can be coordinated with an externally-provided time, such as standardized time provided by a Coordinated Universal Time (UTC) server 120. For instance, collector devices 104 can obtain standardized time by directly accessing a UTC server 120 over the Internet. In other instances, the command center 112 can access the UTC server and then provide the time to the collectors 104. At each collector device 104, the method further operates by generating a collector clock (e.g., from a local oscillator circuit), and maintaining a collector network time using the collector clock as a time base. The collector determines the first timing from the collector network time (at each collector device 104). Additionally, at each collector device 104, the frequency of the AC carried on the power distribution lines can be tracked or sensed. Moreover, the method includes determining the second timing is determined from the AC frequency. The method also includes adjusting the endpoint network time, at each endpoint device 102*a*-102*f*, in response to time indicating packet/data received from a collector device 104*a*-104*b*.

The method useful for coordinating communications can include additional steps. For example, the method can further include calculating the time from the end of a first frame to the start of a second frame. The end of the first frame is determined based on the second timing, and the start of the second frame is determined based on the first timing. In these embodiments, an additional step of determining how many synchronization symbols can be transmitted before the start of the second frame is also included with the step of calculating the time from the end of the first frame to the start of the second frame. The number of synchronization symbols is determined based upon the rate of symbol transmission for the first frame and the calculated time. In certain other embodiments, the network time is adjusted based upon an externally maintained standardized time.

As used herein, the term metrology/metrological time denotes a clock that keeps the time of day. For instance, the International Bureau of Weights and Measures (BIPM) is responsible for maintaining accurate worldwide time of day. It combines, analyzes, and averages the official atomic time standards of member nations around the world to create a single, official Coordinated Universal Time (UTC). Such a clock is based upon a timescale that is designed around the time of one rotation of the Earth. Such a design can include compensation for mismatches between the (slowing) rotation of the Earth and a particular timescale. While aspects of the present disclosure are not necessarily reliant upon the specific governing body that maintains such a metrological time, a particular example thereof can be useful in discussing various aspects of the present disclosure.

The first timing defines when data frames are transmitted and data symbols are transmitted in response to sensing phases of the AC thereafter in other example embodiments. In other example embodiments, the data symbols used in this method can be useful for coordinating communications that uses quadrature phase shift keying (QPSK) encoding. The embodiments of this method that utilize QPSK or other encoding protocols (e.g., amplitude shift keying, differential phase shift keying or frequency shift keying) can track the frequency of AC by periodically executing an interrupt service routine (ISR) that monitors a sensed signal value of the AC. This ISR can be operated at a rate that is sufficiently fast to allow an endpoint to decoded QPSK symbols using another interrupt routine to sense a signal value of the AC.

Figure 2:
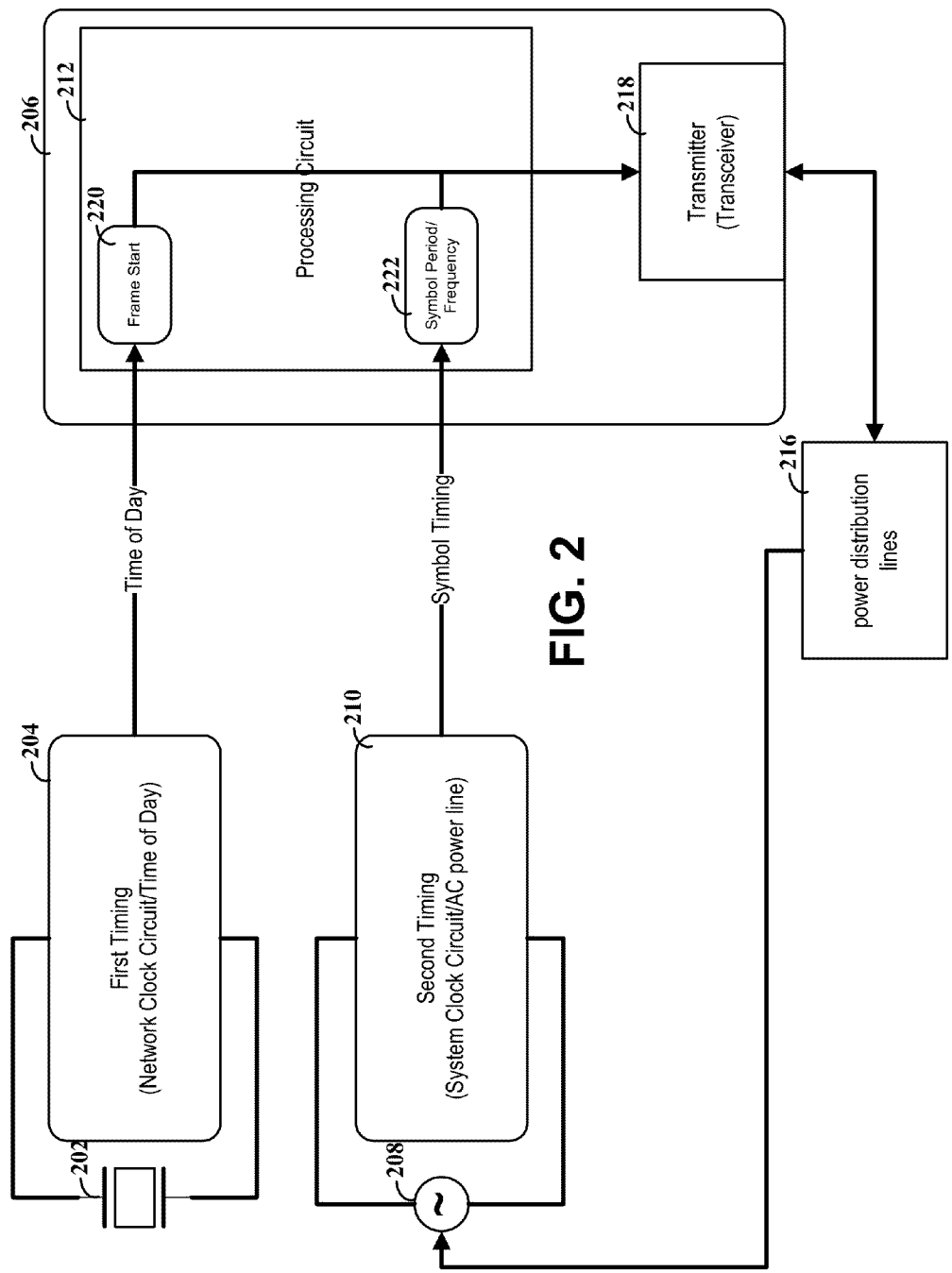
FIG. 2 depicts a block diagram for a device for coordinating communications on power distribution lines, consistent with embodiments of the present disclosure.

FIG. 2 depicts a block diagram for a device for coordinating communications on power distribution lines, consistent with embodiments of the present disclosure. A device 206 is configured to transmit data on power distribution lines 216 using data provided from processing circuit 212 to transceiver 218. In particular embodiments of the present disclosure, the device 206 is a collector device 104 that is configured to transmit to endpoint devices 102. The processing circuit 212 generates symbol-encoded data in which multiple symbols form a data frame. Each symbol represents one or more data bits that are in turn represented by a modulated carrier signal that is transmitted by transceiver 218 onto the power distribution lines. For instance, transceiver 218 can transmit symbols on power distribution lines 216 by modulating phases of a carrier wave. The particular modulation is based upon the symbol-encoded data, which was determined based upon the data to be transmitted, and by the particular encoding scheme.

Aspects of the present disclosure recognize that the AC transmitted on the power distribution lines can be used to help maintain synchronicity between a collector and multiple endpoint devices. Accordingly, the collector can be configured to use the AC timings 208 as part of a second timing (the first operation being discussed hereafter) operation 210. For instance, the symbol period/frequency 222 for the encoded-symbols transmitted on the power distribution lines can be set according to the AC timings. In some instances, the endpoints can also be configured to monitor the AC signal (locally) and use AC timings as a basis for their respective decoding operations. The AC timings can be provided by monitoring signal events, such as zero crossings, of the AC signal. The zero crossings are but one example and others are possible, such as detecting a particular non-zero signal value, signal edges, and/or minimum/maximum signal values.

Other aspects of the present disclosure recognize that a system time reference can be beneficial to coordinating communications between endpoints and collectors. For instance, operations such as meter readings rely upon the (metrology) time-of-day (e.g., as relevant to billing and/or other reporting aspects). Thus, aspects of the present disclosure are directed toward the collector being configured to use another clock source 202 (e.g., a time-of-day clock using a local crystal oscillator) in connection with a first timing operation 204. This first timing operation 204 can be used to determine the start timing of frames 220, where the frames contain symbols using the second timing operation 210. The clock source 202 can be maintained using a local oscillator (or another timing source) while also being occasionally updated based upon timing information received from a UTC server (either directly or via command center 112).

Aspects of the present disclosure are also directed toward compensating for differences between the second timing operation 210 and the first timing operation 204. For instance, the collector 206 can be configured and arranged to transmit using a data frame that uses at least one synchronization symbol, having a predetermined symbol period, to be transmitted before the start of the data frame. For instance, a communication protocol may define several synchronization symbols. These synchronization symbols will be detected by a decoder and used to generate timing information that is used to decode of subsequently transmitted data-carrying symbols. The data-carrying symbols are then transmitted. Both the synchronization symbol(s) and the data-carrying symbols use the second synchronization operation 210; however, the start of the data transmission is set using the first timing operation 204. At the end of the data frame, the collector determines the time before the data-carrying portion of the next data frame is to occur using the first timing operation 204. From this determination, the collector calculates a synchronization time during which synchronization symbols are transmitted. The collector then transmits a number of synchronization symbols that correspond to the synchronization time.

Particular embodiments of the present disclosure are directed toward communication protocols for which a symbol period includes multiple signal events on the AC line. For instance, a symbol can be transmitted over a symbol period corresponding to 4 zero crossings. In such an instance, the collector determines how many synchronization symbols to transmit based upon the number of zero crossings that are expected to occur during the calculated synchronization time and the symbol period. More particular embodiments determine when the number of expected zero crossings is not evenly divisible by the symbol period. For instance, a symbol period of 4 zero crossings would not be evenly divisible relative to an expected number of zero crossings that is 17. For such a situation, there could be 4 symbols (16 zero crossings) leaving one zero crossing extra. Accordingly, embodiments of the present disclosure adjust the symbol period for one symbol to accommodate the one extra zero crossing. This adjustment could include either lengthening or shortening the symbol period.

Certain embodiments of the present disclosure allow for the adjustment of the symbol period to be independent of endpoint configuration. Thus, the endpoint need not be configured to decode a symbol that has the adjusted period. The subsequent synchronization symbols, however, can be transmitted using the correct/common symbol period and therefore can be decoded by endpoints.

Figure 3:
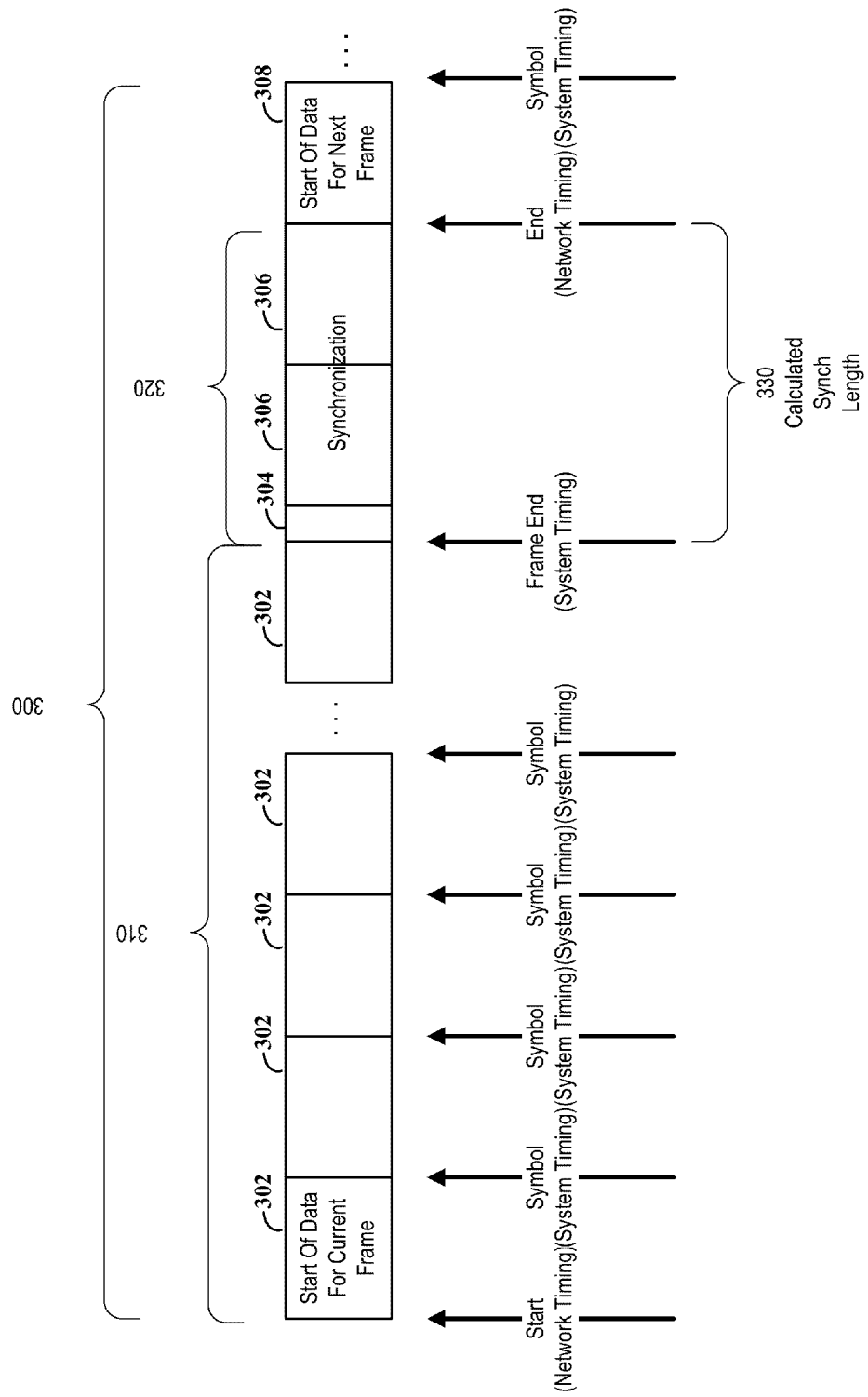
FIG. 3 depicts a timing diagram for frames transmitted over power distribution lines, consistent with embodiments of the present disclosure.

FIG. 3 depicts a timing diagram for frames transmitted over power distribution lines, consistent with embodiments of the present disclosure. The transmission period 300 includes data portion 310 and synchronization portion 320. As depicted in FIG. 3, the beginning of the data portion 310 is synchronized according to a network time, which would correspond to a first synchronization. The particular symbols 302 within the data portion 310 are synchronized according to a system time. In particular embodiments, the system timing is based upon the frequency of AC on the power distribution lines (e.g., obtained by monitoring zero crossings). The symbol period is set by, and varies according to, the frequency of the AC (e.g., defined as a set number of zero crossings). Each data symbol 302 can thus be transmitted using the AC as a timing reference.

When the end of the data portion 310 is reached, the synchronization length 330 can be determined based upon the current time and the start time for the data portion of the next frame 308. This start time is based upon network timing (e.g., local oscillator and metrology time). A certain number of synchronization symbols 306 are determined as being able to be transmitted during the synchronization length 330. The collector can also determine whether an adjusted symbol period for one symbol 304 would provide better synchronization.

Figure 4:
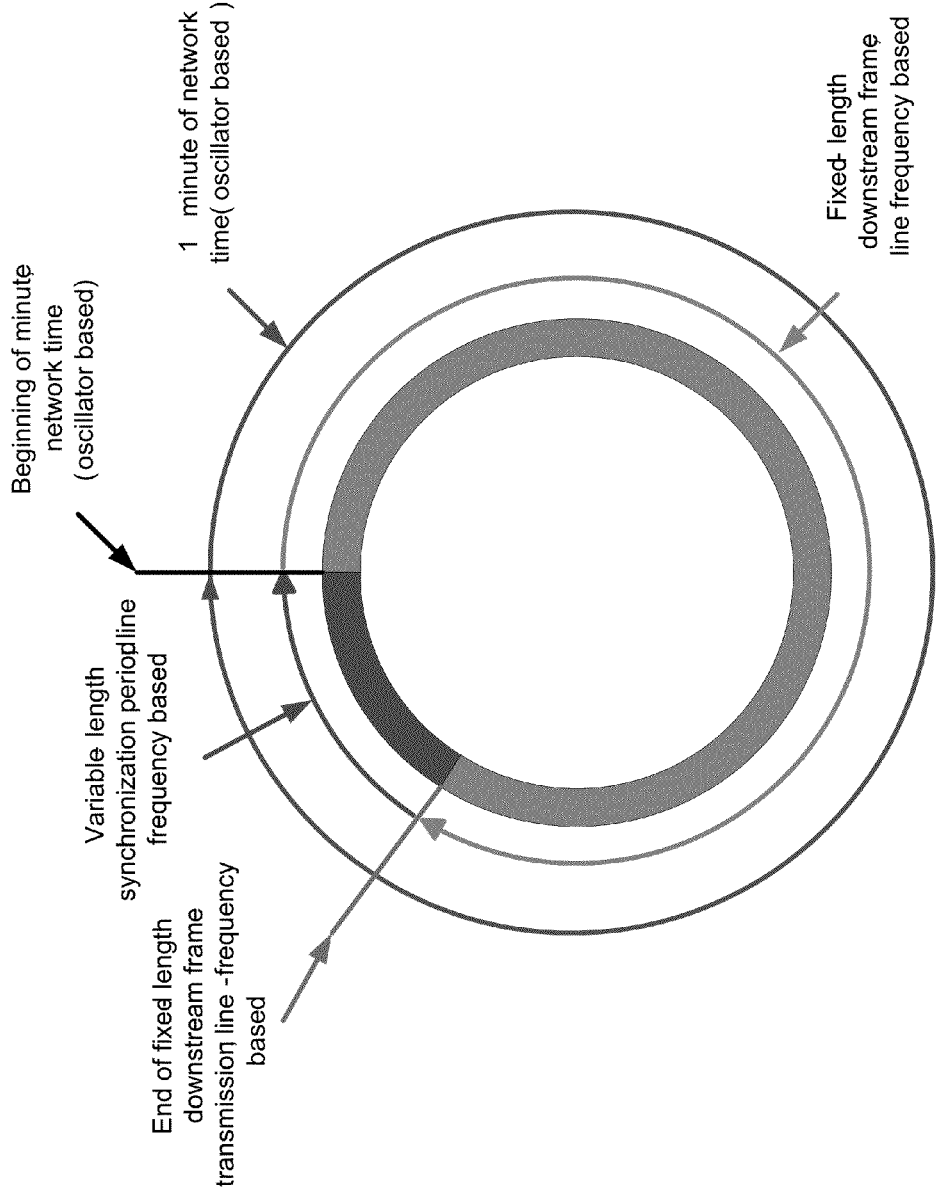
FIG. 4 depicts a timing diagram for coordinated transmissions, consistent with embodiments of the present disclosure.

FIG. 4 depicts a timing diagram for coordinated transmissions, consistent with embodiments of the present disclosure. In a particular embodiment of the present disclosure, the collector calculates how much time there is until the beginning of the minute of the network clock. Thus, the collector-to-endpoints are synchronized to provide one frame per minute. Timeframes other than a minute can also be used. Then, the collector predicts how many line crossings it will take to reach the beginning of the minute. Alternative embodiments may not expressly calculate a number of line crossings. For instance, the timing could be based upon a predicted symbol period as adjusted for the frequency of the AC. This prediction can be accomplished, for example, using an average frequency of line crossings for the last minute (or over another period of time). It then correlates the number of predicted line crossings with the number of line crossings per symbol (the symbol period). If the result is an integer, the collector is configured to output the appropriate number of symbols in order to reach the beginning of the next minute. If the calculation results in a number of symbols that would go past the beginning of the minute, the first symbol of the synchronization period is shortened by the appropriate number of zero crossings to result in synchronization period transmission that ends as close to the beginning of the minute as possible. Alternatively, if the calculation results in a number of symbols that ends before the beginning of the minute, an additional symbol is added, which contains the appropriate number of zero crossings to result in synchronization period transmission that ends as close to the beginning of the minute as possible. In either event, the altered symbol can be transmitted before the unaltered symbols (or any time before a minimum number of synchronization symbols used as part of the communication protocol).

According to certain embodiments, the synchronization symbols can be followed by a start bit. An endpoint that receives a series of synchronization symbols will wait for receipt of a start bit, which indicates the beginning of the data-carrying portion of the frame. In the diagram of FIG. 4 this start bit would be provided at the beginning of the minute—network time.

Consistent with embodiments of the present disclosure, the collector includes a processor circuit that is configured and arranged using software-programmed instructions. These software-programmed instructions can include, but are not limited to, an interrupt service routine (ISR) or a polling procedure that is called/ran at a rate sufficient to synchronize actions with the frequency of the AC. For instance, the call rate of the ISR can be 10 kHz. This rate is not limiting and various other rates can be implemented depending upon factors such as the fidelity of the AC signal and the processing speed of the processor circuit, e.g., including, but not limited to rates of 1 kHz and higher. For instance, the rate can be set according to the ability of the ISR to reliably check for AC zero crossing events. In one embodiment, a line crossing flag can be set independent of the ISR whenever a power line zero crossing has been detected. The ISR can then check for this flag bit to determine the appropriate action. For instance, the ISR can count the number of flag bits detected since the previous symbol was modulated. When the count reaches a set number (the symbol period of the transmitter), the next symbol in the frame can be modulated.

Figure 5:
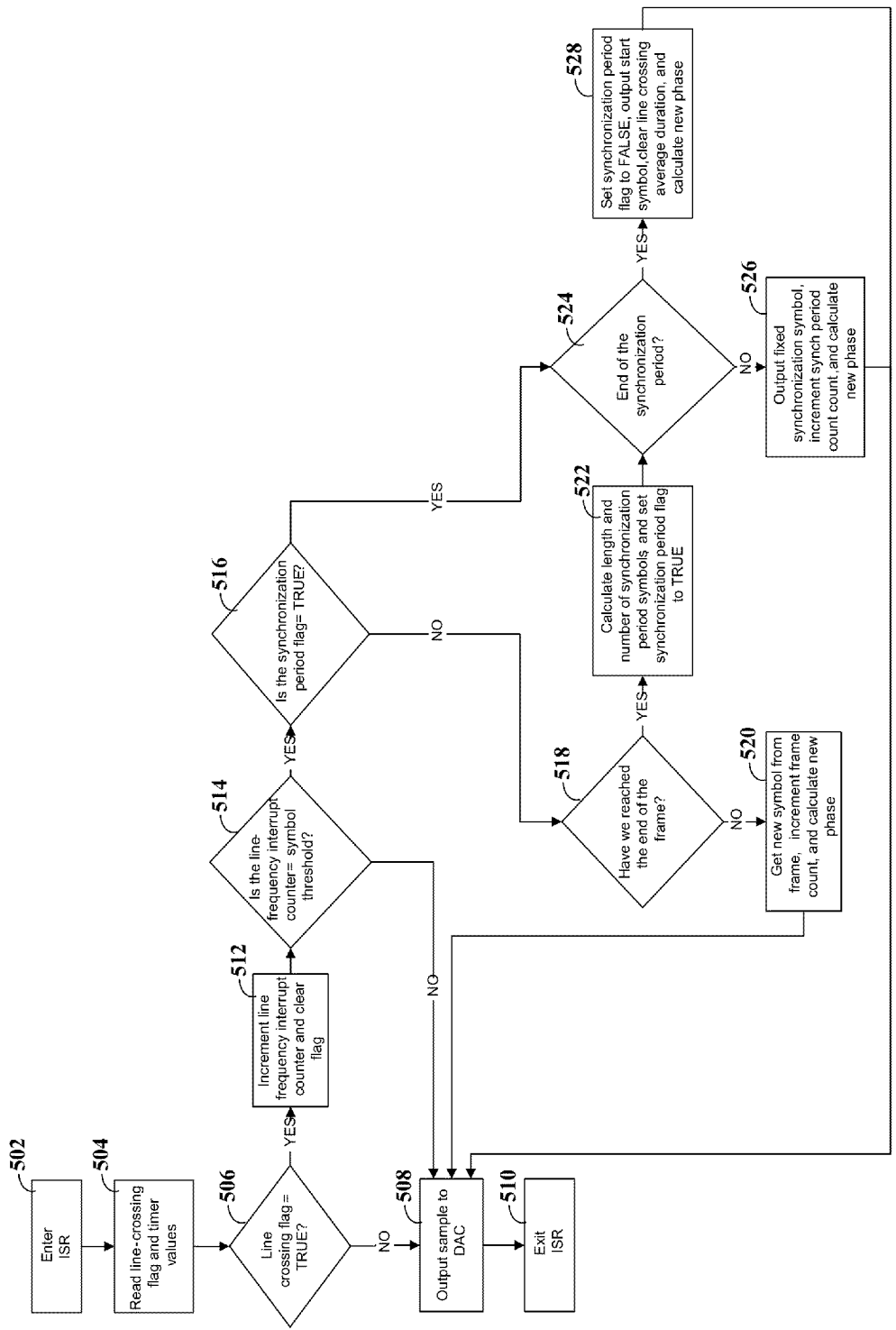
FIG. 5 depicts a flow diagram for an ISR, consistent with embodiments of the present disclosure.

FIG. 5 depicts a flow diagram for an ISR, consistent with embodiments of the present disclosure. The algorithm corresponding to this flow diagram can be useful to describe certain aspects of the present disclosure. This algorithm, however, is a specific example and does not necessarily limit the scope of other embodiments discussed herein. For instance, a (periodic or event-triggered) polling procedure can be used.

At block 502 the ISR is entered. In certain embodiments of the present disclosure, the ISR can be entered periodically, e.g., in response to a timer event. At blocks 506, the processor circuit can determine if a (AC) line-crossing event has occurred since the last ISR was entered. This can be accomplished, for example, by reading, per block 504, a flag or register that is set in response to a line-crossing event. A line-crossing event can represent a zero-crossing event, or other non-zero crossing points. Alternatively, other phase-related detections can be used, such as min-max detection to detect signal peaks of the AC.

If no line-crossing (or equivalent) event has occurred, then a current value for the transmission signal (sample) can be sent to a digital-to-analog converter (DAC) for transmission on a power distribution line. For instance, the communication protocol can operate by modulating one or more carrier waves. The current state of the carrier wave (e.g., the current phase for a phase-shift-keyed protocol) determines the sample that is sent to the DAC. Block 508 therefore represents a situation where there is no need to modulate the carrier wave (e.g., the next symbol period has not been reached). The ISR can then be exited at block 510.

If a line-crossing event has occurred, then the line-frequency interrupt counter can be incremented and the line-crossing flag can be cleared as shown by block 512. The line-frequency interrupt counter keeps track of the number of line-crossings that have occurred during the current symbol period. Accordingly, block 514 represents a check on whether or not the frequency interrupt counter indicates that the next symbol period has been reached (e.g., by comparing the frequency interrupt counter to a threshold value representative of the symbol period). As an example, the symbol period could be set to 10 line crossing events. The frequency interrupt counter would then need to have been incremented 10 times before meeting the symbol threshold. If the current symbol period is not indicated as having been completed, then the ISR moves to block 508. If, however, the current symbol period is indicated as having been completed, then the ISR advances to block 516.

At block 516, the ISR checks whether the transmission is in a synchronization portion/period or data portion/period of a current frame. In certain embodiments, this check can be accomplished by reading a flag or register that is set when a synchronization period begins. If the current period is not determined to be a synchronization period, the ISR advances to block 518. If the current period is determined to be a synchronization period, the ISR advances to block 524.

At block 518 the ISR checks whether or not the end of a data-portion of a current frame has been reached (e.g., by checking a frame count against a threshold value). If not, then the ISR would advance to block 520 in order to provide the next data symbol. At block 520, the ISR determines the modulation for the next data symbol. For instance, a phase-shift-keyed modulation scheme would involve determining the new phase for a carrier wave. The ISR would also keep track of the current location within a frame (e.g., by incrementing the frame count). Once the modulation (phase) is determined, the resulting sample is then provided to the DAC at block 508.

Figure 6:
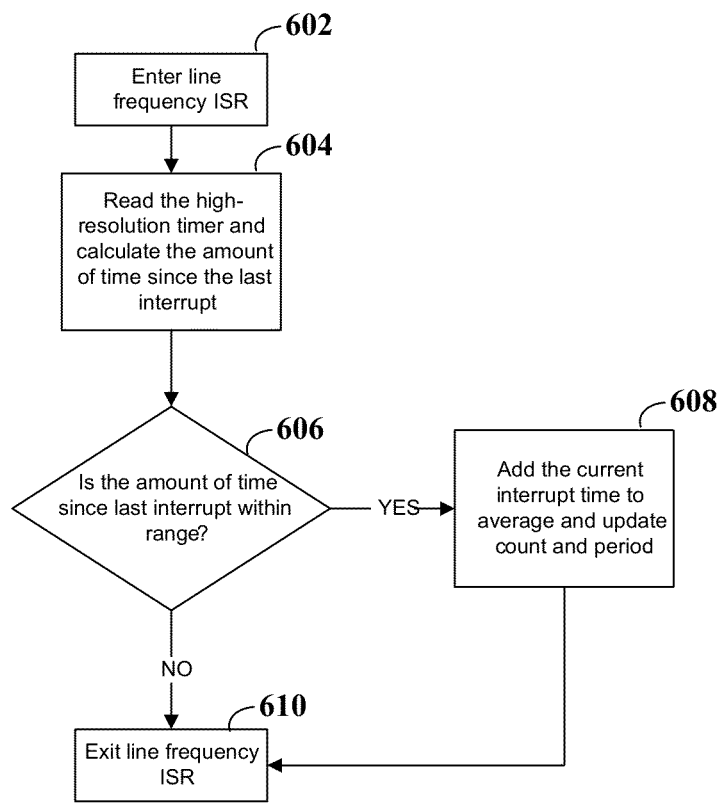
FIG. 6 depicts a flow diagram for an AC line-frequency ISR that can be used to determine the average line frequency of that AC, consistent with embodiments of the present disclosure.

At block 522, the ISR determines the synchronization length. This determination can be a function of the current network time, the symbol period, the average AC frequency over the past frame(s), and the network time corresponding to the desired start for data portion of the next frame. FIG. 6 and the forthcoming discussion thereof provide more details of example synchronization calculation algorithms for determining the average AC frequency.

At block 524, the ISR determines whether the current synchronization period has reached an end (e.g., by checking a synch period count value or by checking a start data frame flag). If the period has not ended, then the modulation for the next synchronization symbol is determined (e.g., the proper phase) at block 526 and, if necessary, a symbol count value is incremented to represent that the next synchronization symbol period has been entered. The resulting sample is then provided to the DAC at block 508.

At block 528, the ISR has determined that the current synchronization period is over and that the next data period has begun. Accordingly, the synchronization period flag can be reset/set to false. The modulation for the start of the data period can also be determined, e.g., by determining the value for a start bit that will be recognized by downstream endpoints. The sample corresponding to this modulation can then be provided to the DAC at block 508.

FIG. 6 depicts a flow diagram for an AC line-frequency ISR that can be used to determine the average line frequency of that AC, consistent with embodiments of the present disclosure. Consistent with embodiments of the present disclosure, the collector is configured to account for variation in the line-frequency of the AC over time and/or a lack of synchronization between the AC frequency and the network time. For instance, the collector can predict the number of line crossing events that will occur between the end of a current data frame and the start of the next data frame (determined based upon network time). This prediction uses the past AC frequency to predict the future AC frequency. For instance, the AC line-frequency ISR is entered at block 602 in response to detection of a line-crossing (or equivalent) event. At block 604, the AC line-frequency ISR determines the time since the last line-crossing event occurred. In certain embodiments, this determination can be made by accessing a high-resolution timer. For instance, the high-resolution timer can be free running relative to the AC timings and the current value can be compared to a value corresponding to a previous line-crossing event to determine the elapsed time. The high-resolution timer can also be reset upon a valid line-crossing event.

Block 606 represents a determination of whether or not the line-crossing event is valid. If, for example, the current line-crossing event is not within an acceptable range, this may indicate that the line-crossing event was caused by noise or other unwanted interference. In such an instance, the AC line-frequency ISR can exit at block 610 and not use the current (invalid) line-crossing event to calculate the AC line-frequency. If, however, the current line-crossing event is within an acceptable range of time, the AC line-frequency ISR proceeds to block 608. At block 608, the AC line-frequency ISR updates the AC line-frequency using the timing of the current line-crossing event. This information can be used in a number of manners including, but not necessarily limited to, a running average of the AC line-frequency. More sophisticated averaging algorithms can also be used.

The signals and associated logic and functionality described in connection with the figures can be implemented in a number of different manners. Unless otherwise indicated, various processor-based systems and/or logic circuitry (sometimes referred to as logic modules or software-based computer modules) may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe communications, protocols, applications, implementations, mechanisms, etc. One such technique is the description of an implementation of a technique expressed in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, it is recognized that a block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions can be stored for execution in a manner consistent with one or more of the methods of the present disclosure. The instructions can be used to cause a general-purpose or special-purpose processor that is programmed with the instructions to perform the steps of the methods. Alternatively, the steps might be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration only and should not be construed to limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on mechanisms for synchronization with (and/or tracking of) the AC line frequency. Such modifications and changes do not depart from the true spirit and scope of the present disclosure, which is set forth in the following claims.

What is claimed is:

1. A method useful for coordinating communications between multiple endpoint devices and multiple collector devices, the communications occurring over power distribution lines that carry power using alternating current (AC), the method comprising:
   communicating data from the collector devices to the endpoint devices over the power distribution lines using a communication protocol that uses a first timing and a second timing, the first timing being a parameter that indicates when data frames are to be transmitted and the second timing being a parameter that indicates when symbols within the data frames are to be transmitted;
   at each collector device,
      maintaining a collector network time using a locally generated time base;
      determining the first timing and the second timing based on a frequency of the AC; and
      providing the collector network time to the endpoint devices.

2. The method of claim 1, further including the steps of calculating the time from the end of a first frame, as determined by the second timing, to the start of a second frame, as determined by the first timing; and determining how many synchronization symbols can be transmitted before the start of the second frame, the number of synchronization symbols being determined based upon a rate of symbol transmission for the first frame and the calculated time.

3. The method of claim 1, wherein the collector network time is adjusted in response to a standardized time that is maintained external to the collector device.

4. The method of claim 1, wherein the first timing defines when data frames are transmitted, and thereafter, data symbols are transmitted in response to a detected frequency of the AC.

5. The method of claim 1, wherein the data symbols are encoded using one of amplitude shift keying, quadrature phase shift keying, differential phase shift keying and frequency shift keying.

6. The method of claim 5, further including a step of sensing the frequency of the AC carried on the power distribution lines by periodically operating a software code module to sense a signal value of the AC, wherein the software code module is periodically operated at a rate that is sufficiently fast to provide synchronicity for the encoded symbols to be decoded at an endpoint device using another software code module to sense a signal value of the AC.

7. The method of claim 6, wherein the rate is over 1 KHz.

8. The method of claim 1, wherein the step of communicating data from the collector devices includes communications to at least a thousand endpoints from one of the collector devices.

9. The method of claim 1, further including a step of determining a frequency of the AC by one of sensing a zero-crossing event and sensing a minimum/maximum signal event.

10. A method comprising:
    maintaining a transmission period having a start time and an end time that are each synchronized to network time;
    in response to the start time, transmitting a frame between circuitry of at least one collector device and circuitry of at least one endpoint device, over power distribution lines, that includes a plurality of data-carrying symbols, in response to a timing parameter derived from an alternating current (AC);
    in response to reaching an end of the frame,
       determining a synchronization symbol period for a synchronization symbol as a function of transmission times for the plurality of data-carrying symbols in the frame and time from the end of the frame to the end time; and
    transmitting the synchronization symbol on the power distribution lines.

11. The method of claim 10, further including a step of transmitting additional synchronization symbols before the end time, wherein the additional synchronization symbols have a symbol period that is different from the determined synchronization symbol period.

12. The method of claim 10, wherein each symbol of the plurality of data-carrying symbols has a common symbol period and the synchronization symbol period is different from the common symbol period.

13. The method of claim 10, wherein each symbol of the plurality of data-carrying symbols has a common symbol period, wherein the step of determining the synchronization symbol period includes determining a number of symbols, having the common symbol period, that can be transmitted in the time from the end of the frame to the end time.

14. The method of claim 10, wherein each symbol of the plurality of data-carrying symbols has a symbol period corresponding to a set number of signal transitions of the AC.

15. The method of claim 10, further including a step of determining an average AC line frequency based upon signal transitions of the AC for a previously transmitted frame and wherein the step of determining the symbol period for the synchronization symbol uses the determined average AC line frequency as an input to an algorithm.

16. An apparatus comprising:
    a time clock circuit responsive to a frequency of an alternating current (AC) that is carried on power distribution lines;
    a processing circuit configured and arranged to
       determine a transmission period having a start time and an end time that are each determined using the time clock circuit;
       begin, in response to the start time, transmission of a frame that includes a plurality of symbols, the transmission occurring over the power distribution lines;
       synchronize a transmission time for each symbol of the plurality of symbols with the time clock circuit; and
       in response to reaching an end of the frame, determine a synchronization symbol period for a synchronization symbol as a function of time from the end of the frame to the end time and transmission times for the plurality of symbols; and transmit the synchronization symbol on the power distribution lines.

17. The apparatus of claim 16, wherein each symbol of the plurality of symbols has a common symbol period and the symbol period of the synchronization symbol is less than the common symbol period.

18. The apparatus of claim 16, wherein each symbol of the plurality of symbols has a common symbol period and wherein the processing circuit is further configured and arranged to determine the synchronization symbol period by determining a number of symbols, having the common symbol period, that can be transmitted in the time from the end of the frame to the end time.

19. The apparatus of claim 16, wherein each symbol of the plurality of symbols has a symbol period corresponding to a set number of signal transitions of the AC.

20. The apparatus of claim 16, wherein the processing circuit is further configured and arranged to determine an average AC line frequency based upon signal transitions of the AC for a previously transmitted frame and to determine the synchronization symbol period using the determined average AC line frequency as an input to an algorithm.

* * * * *